(12) United States Patent
Sun

(10) Patent No.: US 8,142,222 B2
(45) Date of Patent: Mar. 27, 2012

(54) JUMPER

(75) Inventor: Zheng-heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 33 days.

(21) Appl. No.: 12/869,708

(22) Filed: Aug. 26, 2010

(65) Prior Publication Data
US 2012/0003865 A1  Jan. 5, 2012

(30) Foreign Application Priority Data

Jul. 2, 2010 (CN) .......................... 2010 1 0216334

(51) Int. Cl.
*H01R 31/08* (2006.01)

(52) U.S. Cl. ...................................... 439/510; 439/513
(58) Field of Classification Search .................. 439/507, 439/510, 511, 512, 513
See application file for complete search history.

(56) References Cited

U.S. PATENT DOCUMENTS

2010/0071953 A1* 3/2010 Ichio et al. .................. 174/72 A
* cited by examiner

*Primary Examiner* — Ross Gushi
(74) *Attorney, Agent, or Firm* — Altis Law Group, Inc.

(57) ABSTRACT

A jumper includes a casing, and two conductive members. The casing defines a first receiving space in a first end, and a second and a third receiving spaces in a second end opposite to the first end. The conductive members are received in the first receiving space.

4 Claims, 6 Drawing Sheets

JUMPER

BACKGROUND

1. Technical Field

The present disclosure relates to a jumper.

2. Description of Related Art

In electronic devices, particularly, computers, jumpers are conductors used to close a break in or bypass part of an electrical circuit. Jumpers are typically used to set up or adjust printed circuit boards, such as the motherboards of computers. Jumper pins (points to be connected by the jumper) are arranged in groups called jumper blocks, with each group having at least one pair of contact points and often more. In general, each contact in a jumper block terminates in a small metal pin. An appropriately sized conductive sleeve called a jumper, or more technically, a jumper shunt, is slipped over the pins to complete the circuit.

When the jumper is used on the jumper block, two pins of the jumper block are connected to each other to form a closed circuit (ON state). Therefore, current may flow between the two pins. When the jumper is removed, the two pins are an open in the circuit (OFF state). However, once the jumper is removed from the motherboard, the jumper may be lost or misplaced and cannot easily be found because the size of the jumper is very small, which will bring inconvenience to the user.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
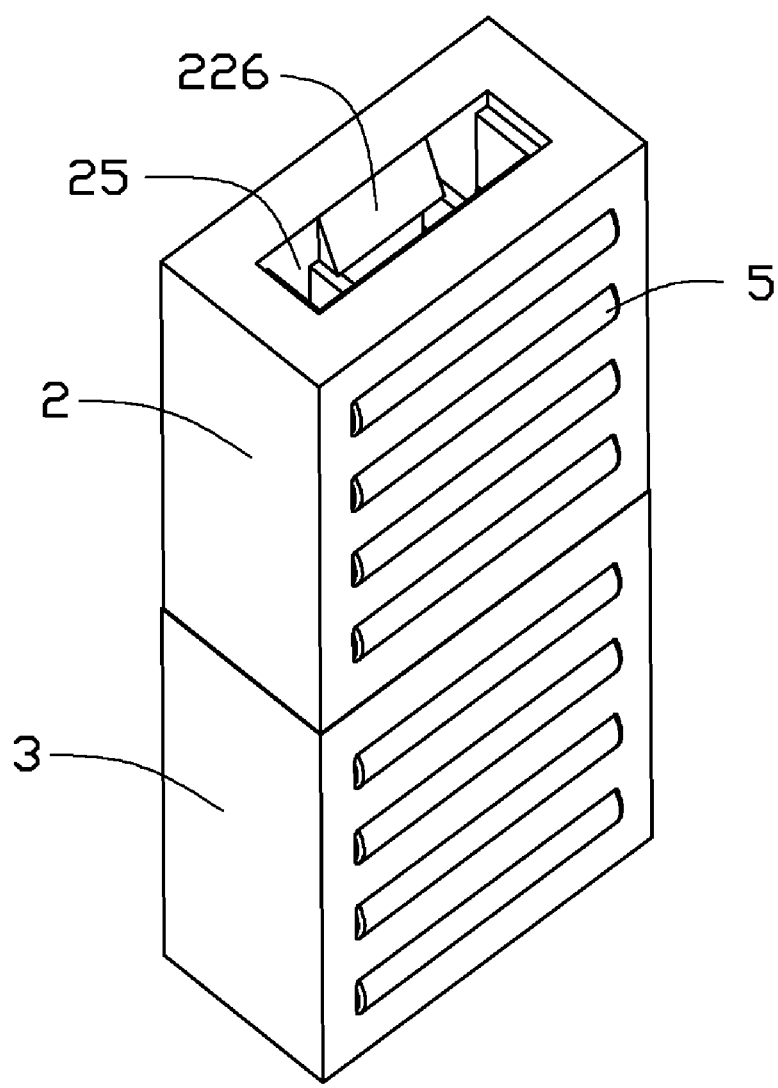
FIG. 1 is an assembled, isometric view of an embodiment of a jumper.
Figure 2:
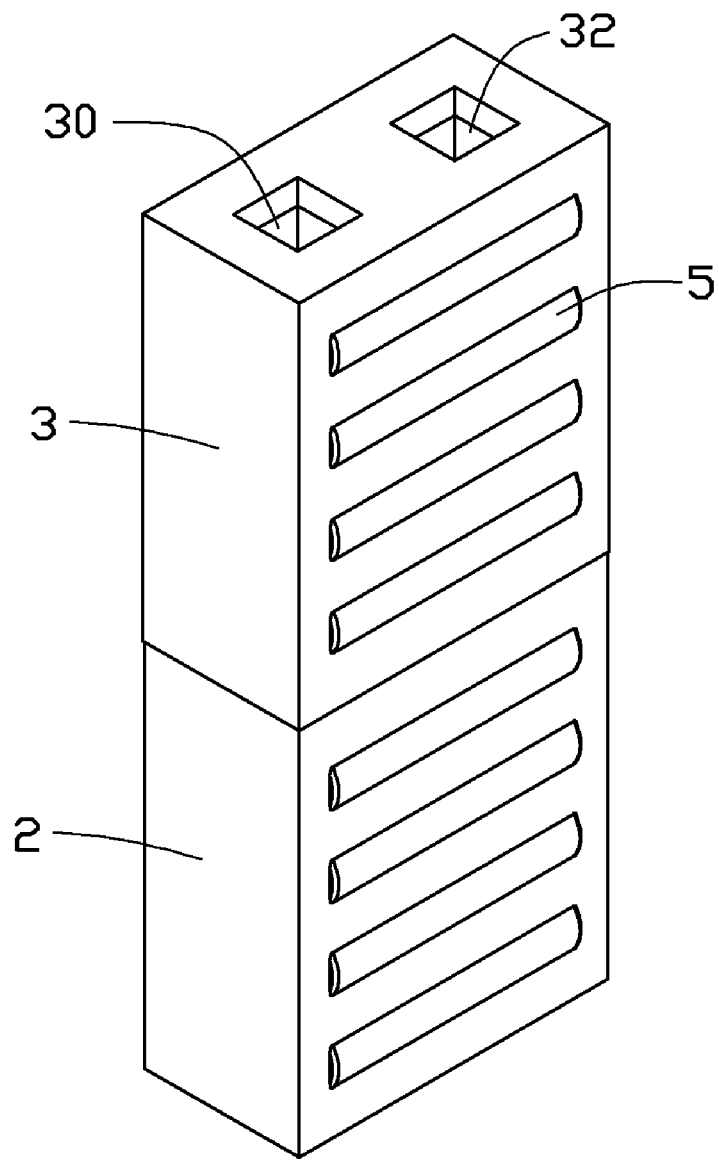
FIG. 2 is an inverted view of FIG. 1.

Referring to FIGS. 1 and 2, an embodiment of a jumper includes a first portion 2 and a second portion 3 integrally formed on the first portion 2. In other embodiments, the second portion 3 may be detachably connected with the first portion 2.

Figure 3:
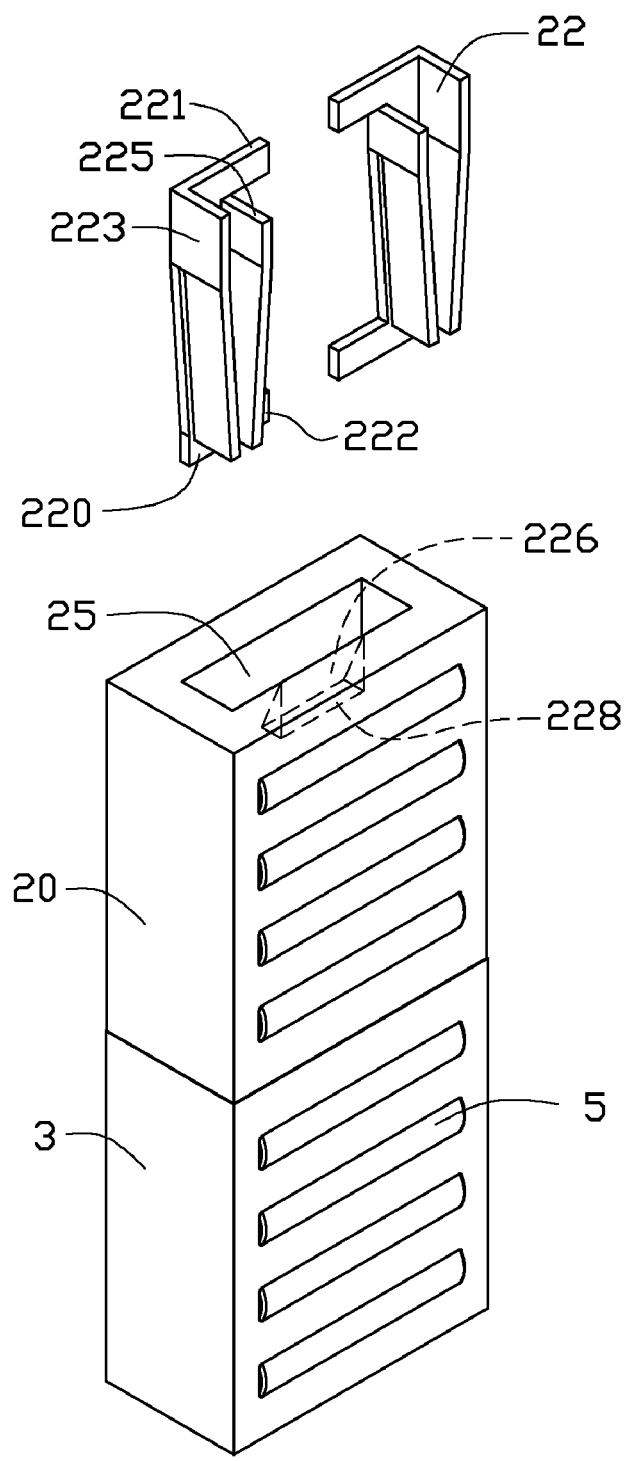
FIG. 3 is an exploded, isometric view of the jumper of FIG. 1.

Referring to FIG. 3, the first portion 2 includes a substantially quadrate casing 20 and two conductive members 22. The casing 20 includes a proximal end connected with the second portion 3 and a distal end (not labeled) far way from the second portion 3. The casing 20 defines a first receiving space 25 extending from the distal end to receive the conductive members 22. The casing 20 is made of dielectric material. The conductive members 22 are made of conductive material.

Each conductive member 22 includes a base plate 220, a first touching sheet 221, a second touching sheet 222, a first clipping sheet 223, and a second clipping sheet 225. The first and second touching sheets 221 and 222 are parallel to each other and protrude from a top end and a bottom end of the base plate 220 in the same direction, coplanar with the base plate 220. The first and second clipping sheets 223 and 225 perpendicularly protrude from opposite sides of the base plate 22, respectively. A distance between the first and second clipping sheets 223 and 225 gradually reduces from the top end to the bottom end of the base plate 220.

A protrusion 226 protrudes from an inner surface of the first receiving space 25. The protrusion 226 includes a blocking surface 228 at a bottom of the protrusion 226. In assembly, the conductive members 22 are inserted into the first receiving space 25 through opposite sides of the protrusion 226. A top of the second clipping sheet 225 of each conductive member 22 resists against the blocking surface 228. The first touching sheets 221 of the conductive members 22 resist against each other. The second touching sheets 222 of the conductive members 22 resist against each other. Thus, the conductive members 22 are fixed in the first receiving space 25.

The second portion 3 is substantially quadrate and made of dielectric material. The second portion 3 defines a second receiving space 30 and a third receiving space 32 in a distal end of the second portion 3 far away from the first portion 2. The second portion 3 is engaged with two jumper pins A and B of a jumper block 4 of a motherboard 100 (shown in FIG. 4). A depth of the second and third receiving spaces 30 and 32 is equal to the length of the corresponding jumper pins A and B. A distance between the second receiving space 30 and the third receiving space 32 is equal to the distance between the corresponding jumper pins A and B.

Figure 4:
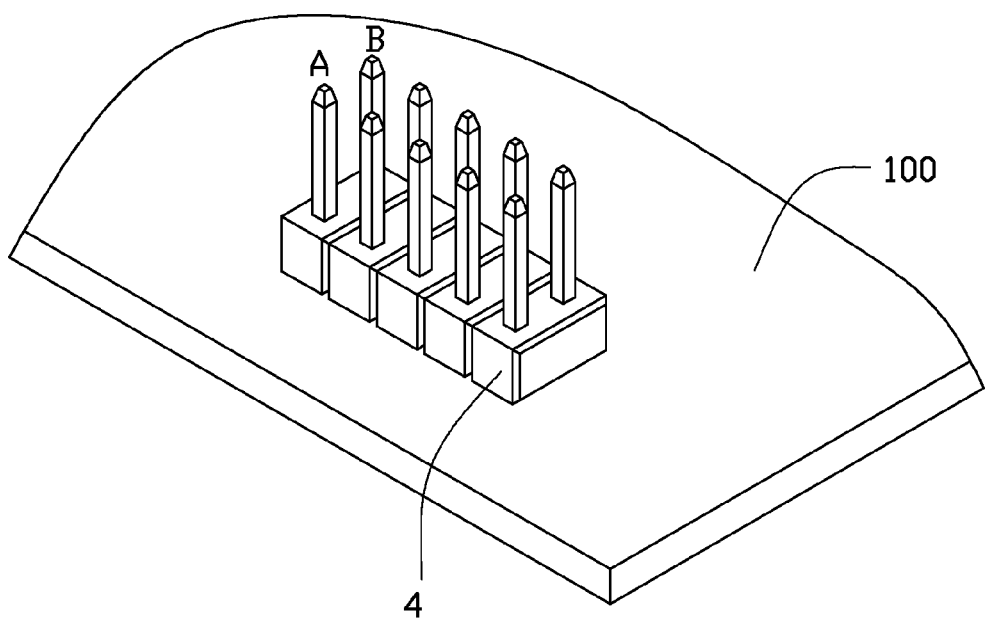
FIG. 4 is a schematic, isometric view of a jumper block installed on a motherboard.
Figure 5:
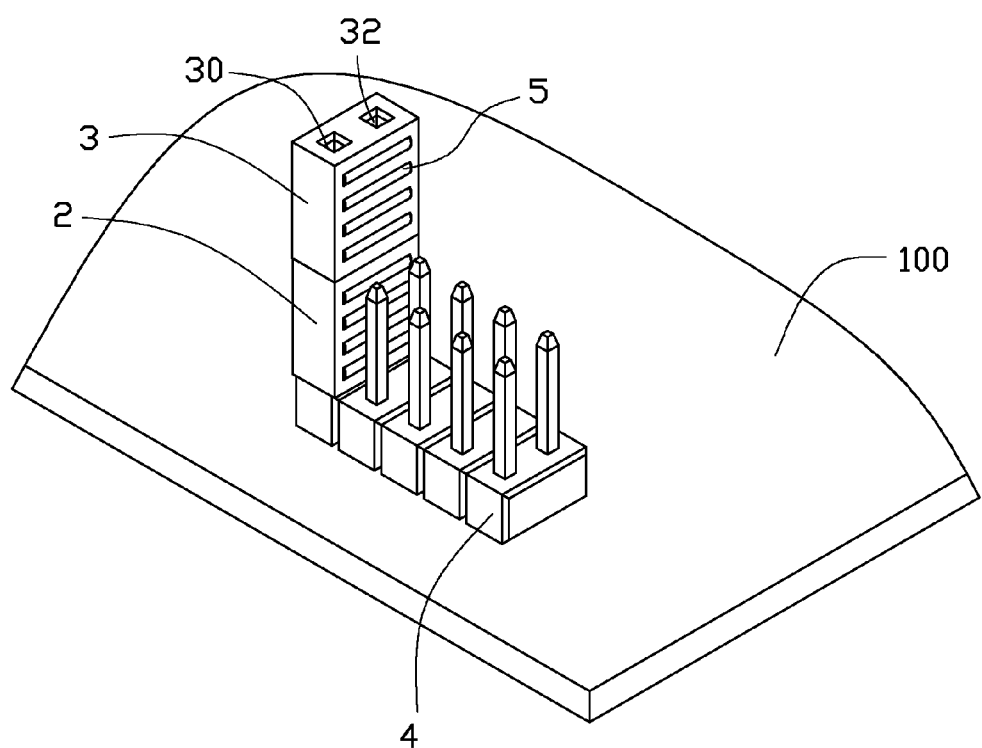
FIGS. 5 and 6 are two different use states of the jumper of FIG. 1.

Referring to FIGS. 4 and 5, in use, when the jumper pins A and B need to be connected together to form a closed circuit (ON state), the jumper pins A and B are respectively inserted into the first receiving space 25 of the jumper, with each latched between the first clipping sheet 223 and the second clipping sheet 225 of a corresponding conductive member 22. The jumper pins A and B are electrically connected together by the conductive members 22.

Figure 6:
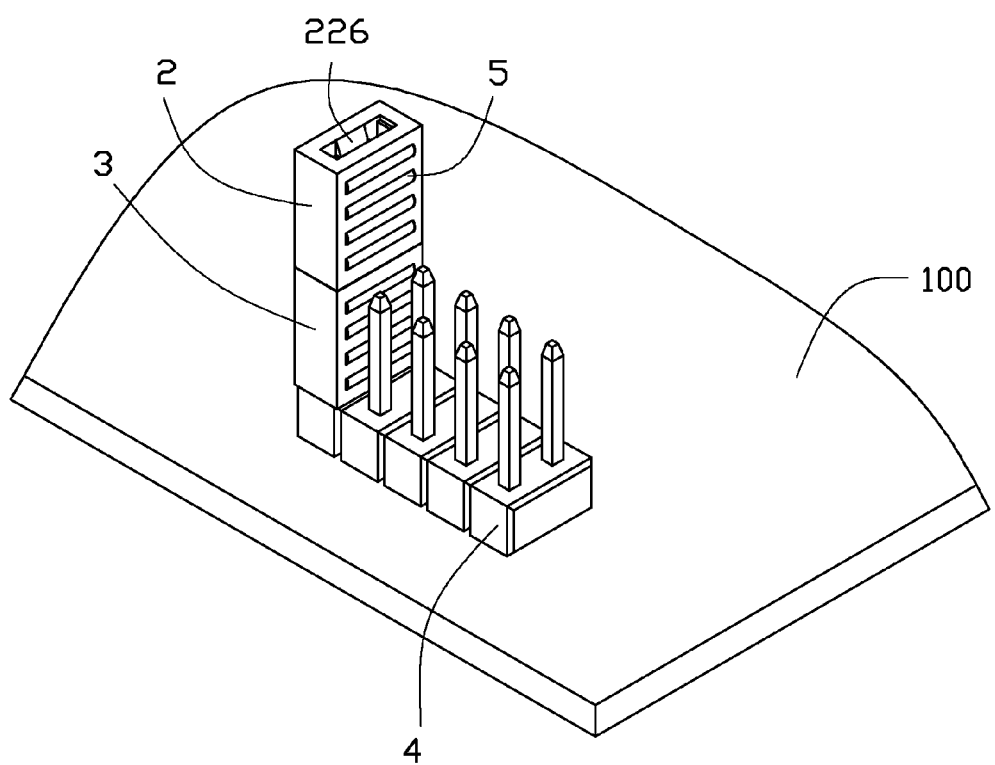

Referring to FIG. 6, when the jumper pins A and B need to be disconnected (OFF state), the jumper is moved up, and the jumper pins A and B are respectively inserted into the second and third receiving spaces 30 and 32, which means no more lost jumpers.

In other embodiments, the outer surfaces of the first and second portions 2 and 3 forms a plurality of grip strips 5 to provide grip assistance for easier assembly and disassembly. The outer surfaces of the first and second portions 2 and 3 can also form different marks (for example different colors) to stand for ON state and OFF state.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A jumper comprising:
a casing made of dielectric material, the casing defining a first receiving space in a first end, and a second and a third receiving spaces in a second end opposite to the first end; and
two conductive members made of electrically conductive material and received in the first receiving space, wherein each conductive member comprises a base plate, a first and a second touching sheets coplanarly protruding from a top and a bottom of the base plate, and a first and a second clipping sheets perpendicularly protruding from opposite sides of the base plate.

2. The jumper of claim 1, wherein a distance between the first and second clipping sheets gradually reduces from the top to the bottom of the base plate.

3. The jumper of claim 1, wherein a protrusion protrudes from an inner surface of the first receiving space to fix the two conductive members, with the first touching sheets resisting against each other and the second touching sheets resisting against each other.

4. The jumper of claim 3, wherein the protrusion comprises a blocking surface on a bottom of the protrusion, to resist against tops of the conductive members.

* * * * *